United States Patent [19]

Marsh, Jr.

[11] 3,812,397

[45] May 21, 1974

[54] INDEPENDENT ELECTRON GUN BIAS CONTROL

[75] Inventor: James Courtland Marsh, Jr., Indianapolis, Ind.

[73] Assignee: RCA Corporation, New York, N.Y.

[22] Filed: Feb. 15, 1973

[21] Appl. No.: 332,685

[52] U.S. Cl....... 315/31 TV, 178/5.2 A, 178/5.4 AC

[51] Int. Cl........................................... H01j 29/70

[58] Field of Search.................. 315/30, 31 TV, 22; 178/5.2 A, 5.4 AC, 5.4 EL, 5.4 ML, 5.4 HE

[56] References Cited

UNITED STATES PATENTS

| | | | |
|---|---|---|---|
| 3,272,914 | 9/1966 | Moles et al. | 315/31 TV |
| 3,701,842 | 10/1972 | Kiekwood et al. | 178/5.4 AC |
| 3,283,065 | 11/1966 | Boekhorst | 315/31 TV |

*Primary Examiner*—Richard A. Farley
*Assistant Examiner*—J. M. Potenza
*Attorney, Agent, or Firm*—Eugene M. Whitacre; Mason DeCamillis

[57] ABSTRACT

Apparatus for independently controlling the cutoff of electron beam current in each of a plurality of electron guns in a color kinescope. The bias voltage that is applied to the cathode of each gun is dependent upon the peak-to-average value of separate controllable pulses supplied to each of the drive circuits of the respective cathodes. The pulse control circuits are operable to provide independent control of the kinescope bias voltage without otherwise affecting operation of the cathode drive circuits. The above apparatus is adjusted during the initial set up of the cut-off biasing potential of the cathodes of the kinescope to insure correct color balance of the guns; that is, to insure that current from each of the cathodes is cutoff at the same time during black or blanking signals and that simultaneous cut-off of all cathodes is relatively independent of fluctuations in line voltage.

4 Claims, 1 Drawing Figure

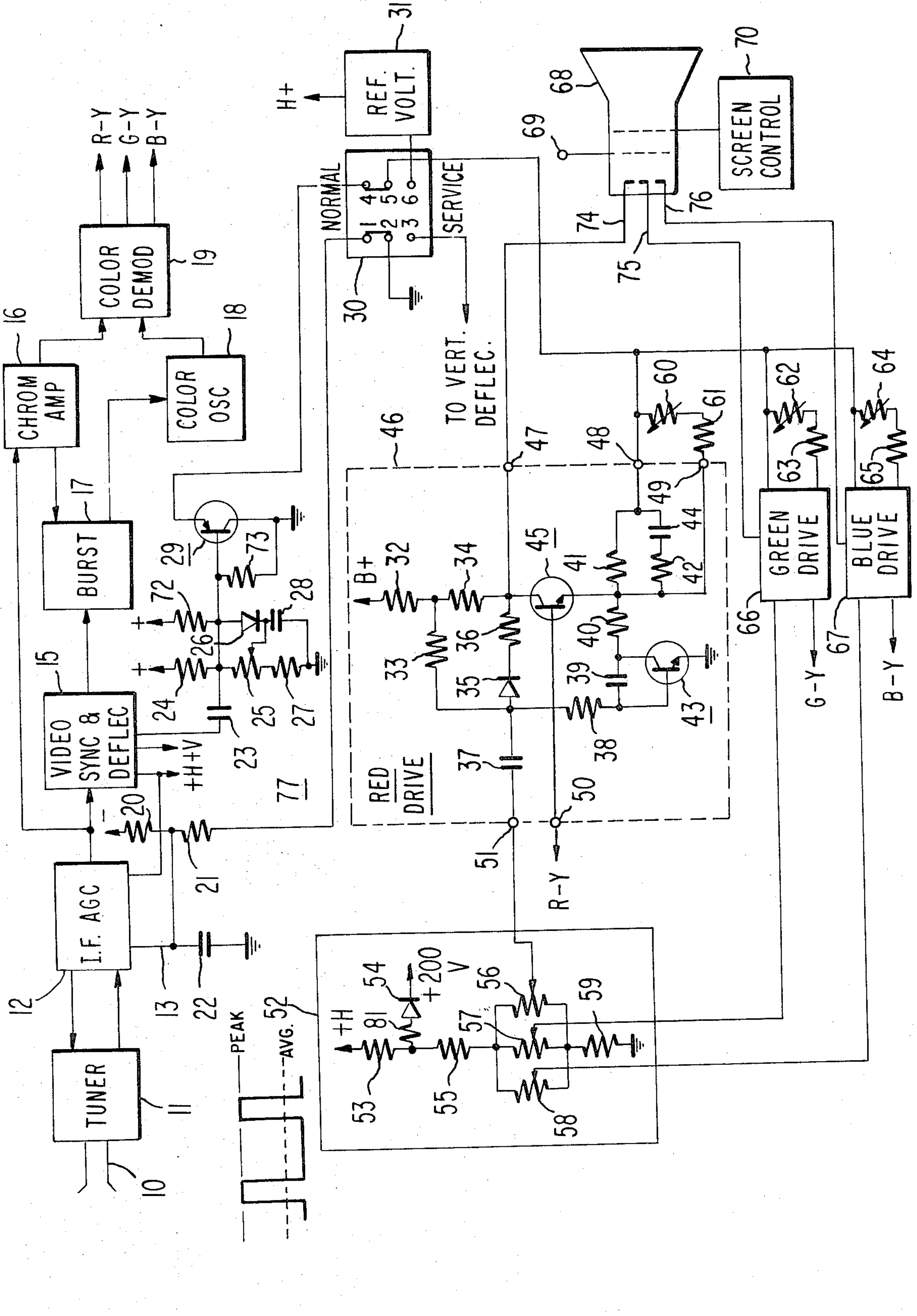
TUNER
I.F. AGC
VIDEO SYNC & DEFLEC
BURST
CHROM AMP
COLOR OSC
COLOR DEMOD
R-Y
G-Y
B-Y
REF. VOLT.
H+
NORMAL
SERVICE
TO VERT. DEFLEC.
SCREEN CONTROL
RED DRIVE
GREEN DRIVE
BLUE DRIVE
B+
+H+V
+H
+200 V
PEAK
AVG.

INDEPENDENT ELECTRON GUN BIAS CONTROL

BACKGROUND OF THE INVENTION

This invention relates to color television receivers and more particularly, to a circuit for independently controlling the bias applied to each of the several cathodes of a color kinescope.

Present color television receivers typically employ both luminance and chrominance signal processing channels. Matrixing of the luminance and chrominance signals may be performed prior to the kinescope and, in that case, color-representative signals (R, G, B) are applied directly to one set of electrodes (e.g., the cathodes) of the kinescope. In another commonly employed system, the luminance signal (Y) is applied in common to the cathodes of the kinescope and appropriate color difference signals (R-Y, B-Y and G-Y) are applied separately to the first control grids of the kinescope. Matrixing is then performed in the kinescope. In either case, there must be adequate provision during the initial set-up of the color receiver for controlling the quiescent or bias potentials of the kinescope screen grids, control grids and cathodes for providing proper color balance between the three color signals. Furthermore, when no video signal is present, the flow of beam current between each cathode and the anode or ultor electrode should be approximately zero, i.e., the beam current should be near the threshold or cut-off level, producing a black screen when a black-representative video signal is present (including during the blanking period).

In many television receivers, the cut-off point of each gun is adjusted by means of separate variable resistances which vary the screen grid bias potential of each gun with respect to ground. Additional separate drive controls associated with each cathode and, in some cases, an additional master bias control coupled to the control grids are provided for set up of the kinescope. Should there exist a drift in the D.C. operating point of the kinescope biasing system, deterioration in the color balance of the reproduced color image may be expected. This multiplicity of controls is generally required in order to properly set-up a color television receiver because the operating characteristics of the several electron guns may be expected to vary one from another.

While these known set-up arrangements have been found suitable for many prior receivers employing known picture tubes, they are not suitable for use in connection with the recently announced precision, in-line gun picture tubes such as the RCA Type 15VAOTC01. In this latter type of device, only a single first control grid and a single screen grid are provided for the three cathodes. Thus, there is no provision for separate adjustment of red, green and blue gun screen potentials as in prior apparatus. Only the cathodes of the three guns are available for separate adjustment of the cutoff points of the guns. Provision should also be made for compensating for relative drifts among the bias circuits with changes in line voltage. If such a single-control grid, single-screen grid kinescope uses an unregulated bias voltage supply system, provision should be made for tracking the changes in line voltage such that the color balance between channels remains approximately the same and all three cathodes cut off at the same time. The controllable D.C. biases that are applied to the kinescope should not interfere with the luminance and chrominance information also applied thereto.

In accordance with the present invention, apparatus for controlling electron beam current in a color picture tube having a plurality of electron guns comprises a plurality of amplifier circuits each having an output electrode direct current coupled to a respective cathode of one of the guns and first and second input electrodes for application thereto of chrominance and luminance signals, respectively. A single source of repetitive pulses of variable amplitude and a predetermined duty cycle is coupled by means of respective clamping circuits to each of the output electrodes. Respective current supplying devices are coupled to one input electrode of each amplifier circuit and to the associated clamping circuit and are responsive to differences between the quiescent voltage at the associated output electrode and the peak-to-average voltage difference of the applied repetitive pulses for maintaining predetermined direct voltages at the associated cathodes.

The single source of pulses is coupled to each of the clamping circuits by means of individual, separately adjustable voltage divider circuits so as to permit individual adjustment of the cathode bias voltage of each of the electron guns.

DETAILED DESCRIPTION

Reference is made to the FIGURE which is a diagram partially in block form and partially in schematic circuit form of a color television receiver embodying the present invention.

A television antenna 10 responsive to a transmitted television signal is coupled to the input of a tuner 11. The tuner 11 supplies an intermediate frequency (IF) signal to an IF amplifying, detecting and automatic gain control (AGC) circuit arrangement 12. The output of circuit arrangement 12 is coupled to a video amplifying, synchronizing signal separating and deflection circuit arrangement 15 and to a chrominance signal amplifier 16. Circuit arrangement 12 is coupled to an AGC filter capacitor 22 via a conductor 13. The operation of a suitable AGC circuit of this type is described in U.S. Pat. No. 3,634,620 of Jack R. Harford entitled "NOISE PROTECTED AGC CIRCUIT WITH AMPLITUDE CONTROL OF FLYBACK PULSES."

A resistance voltage divider 20, 21 is coupled between a source of voltage (−) and ground potential via terminals 1 and 2 of a "service switch" 30. The capacitor 22 is connected across resistor 21 when switch 30 is in the "NORMAL" position as is illustrated. AGC control of tuner 11 may also be supplied from the I.F.-AGC circuit 12.

The video, sync and deflection circuitry 15 supplies pulses (H and V) in timed relation with the operation of the horizontal and vertical deflection circuitry of the receiver and also provides an amplified luminance signal output. A horizontal pulse output of the video, sync and deflection circuitry 15 and an output of the chrominance amplifier 16 are coupled to a burst separator circuit 17 to retrieve the color synchronizing burst signal in a well known manner. The burst separator 17 is coupled, in turn, to a color oscillator 18 which provides a continuous wave output signal synchronized to the transmitted burst. Outputs from oscillator 18 and chrominance amplifier 16 are coupled to suitable color or chrominance demodulators 19. The demodulators 19 serve to demodulate the chrominance signals with respect to the phase and frequency of the synchronized oscillator reference signal. The outputs from demodulator 19 are conveniently called the color difference signals and are labeled R-Y, G-Y and B-Y respectively. These color difference signals are coupled directly to red, green and blue drive modules 46, 66 and 67. The drive modules 46, 66, 67 matrix the color difference signals with the video signal representative of the luminance information supplied from luminance circuitry generally shown as 77. The matrixed signals (R, G, B) are coupled from the drive modules 46, 66 and 67 to respective cathodes 74, 75 and 76 of the kinescope 68.

The video signals representative of luminance information are coupled from the video, sync and deflection circuitry 15 via a capacitor 23 to the base electrode of an emitter follower transistor 29 in luminance circuit 77. Transistor 29 is shown as a PNP device and has a collector electrode coupled to a point of reference potential. A base biasing voltage divider network including resistors 72 and 73 is coupled between a positive voltage supply terminal (+) and the point of reference potential. The junction between resistors 72 and 73 is coupled to the base electrode of transistor 29. The series combination of a semiconductor diode 26 and an A.C. bypass capacitor 28 is coupled between the base of transistor 29 and the reference voltage point. A further voltage divider including the series combination of resistors 24, 25 and 27 is also connected between a voltage supply terminal and the point of reference potential. Resistor 25 is in the form of a potentiometer and the cathode of diode 26 is coupled to the wiper arm of potentiometer 25 to provide brightness control for the luminance signal. The emitter electrode of transistor 29 is coupled to terminal 4 of the service switch 30.

In the "NORMAL" position of service switch 30 (as shown), terminals 1 and 2 serve to return the resistor 21 in the AGC circuit to ground, while terminals 4 and 5 serve to couple the luminance signal to the red, green and blue drive modules 46, 66, 67 (e.g., to terminal 48 of red drive module 46).

In the "SERVICE" position of switch 30, terminals 2 and 3 serve to disable the vertical deflection circuitry by, for example, applying a ground potential to a height control potentiometer (not shown) of the vertical deflection circuit. At the same time, terminals 5 and 6 of switch 30 serve to disconnect the luminance input to the driver stages 46, 66, 67 to permit the driver stages to assume a reference black condition. A separate reference voltage supply 31 also may be coupled via switch terminals 5 and 6 to the drive modules.

Considering the drive modules 46, 66 and 67, the circuitry included therein is identical in each case and is described in detail in U.S. Pat. No. 3,619,488 granted in the name of Donald H. Willis. Those circuits therefore will only be described here in terms sufficient for an understanding of the present invention.

The red color difference signal R-Y from color demodulator 19 is coupled to the red drive module 46 via terminal 50. In a similar manner, the G-Y and B-Y color difference signals from color demodulator 19 are respectively coupled to the color difference input terminals of the green and blue drive modules 65 and 67.

Considering the red drive module 46 which is shown in detail, the matrixed output thereof (R) is obtained from terminal 47 and is directly coupled to the red athode 74 of kinescope 68. Red drive module 46 comprises a bias regulating transistor 43 and an output amplifying transistor 45. The operating point of transistor 43 and, hence, of transistor 45 is determined by means of the bias resistor networks including resistors 32, 33, 38 and a clamp circuit comprising capacitor 37, diode 35 and resistor 36. The clamp circuit 35, 36, 37 operates to maintain the peak of a repetitive pulse waveform supplied to terminal 51 (details of which will be explained below) clamped approximately to the voltage at the collector of transistor 45. A resultant direct voltage produced at the junction of resistors 33 and 38 regulates conduction of transistor 43 and thereby of transistor 45 in a manner which will be explained below and which is also explained in the Willis patent.

An adjustable red drive control resistor 60 is provided in the network 60, 61, 41, 42, 44 which serves to couple the luminance signal output of transistor 29 to drive module 46 (similar drive controls 62 and 64 are associated with modules 66 and 67).

Kinescope 68 has a control grid 69 coupled to an adjustable voltage supply of, for example, +15 volts and a screen grid coupled to a screen grid voltage supply 70 adjustable for supplying a voltage between +400 and +900 volts. In the illustrated embodiment of the invention, a single screen grid and single control grid are shown as noted above. The individual D.C. cut-off controls for the guns of the kinescope 68 are supplied by cathode bias control circuit 52.

Cathode bias control circuit 52 comprises a parallel combination of potentiometers 56, 57 and 58 coupled to a single source of a repetitive pulse waveform (+H) via a series combination of resistors 53, 55 and 59. Resistor 59 is connected between the low voltage end of potentiometers 56, 57, 58 and ground. The wiper of potentiometer 56 is coupled to input terminal 51 of the red drive module 46, while the wipers of potentiometers 57 and 58 are coupled, respectively, to green drive module 66 and blue drive module 67. A resistor 81 and a clamp diode 54 are coupled in series between a voltage supply of approximately +200 volts and the junction of resistors 53 and 55. The repetitive pulse waveform applied to resistor 53 is supplied, for example, from the horizontal flyback transformer (not shown) of the video, sync and deflection circuitry 15. That waveform therefore recurs at the horizontal (line) rate and includes a relatively positive portion of relatively short duration and a relatively negative portion of relatively long duration as shown in the drawing.

When switch 30 is in its "NORMAL" position, the operation of the red drive module is as follows. Luminance signals are supplied from the emitter of transistor 29 via terminals 4 and 5 of switch 30 and the drive control networks to the emitter of transistor 45. The R-Y output of color demodulator 19 is coupled to the base of transistor 45. The luminance gain at the collector electrode of transistor 45 is approximately determined by the ratio of resistor 34 to resistor 60 and is adjusted in the set-up procedure in a manner which is described below. Transistor 45 is responsive to both the color difference signal and the luminance signal for providing at its collector electrode a color signal (R) which is then applied to the cathode 74 of the kinescope. Capacitor 39 and the internal capacitance between the base and collector electrodes of transistor 43 effectively filter or bypass all A.C. signals from the electrodes of transistor 43 and further act as a current source for biasing of transistor 43. The base electrode of transistor 43 is biased by the voltage appearing at the junction of the series combination of resistors 38 and 33. A horizontal pulse whose amplitude is determined by the position of the wiper of potentiometer 56 is applied to the clamp circuit 35, 36, 37. The positive-going horizontal pulse will bend to forward bias diode 35 so as to cause the peak of the voltage waveform at the junction between resistors 33 and 38 to be clamped to approximately the voltage at the collector electrode of transistor 45.

For example, assume that the controllable horizontal pulse as applied to capacitor 37 is set at approximately 180 volts peak-to-peak and is a relatively rectangular pulse waveform. Furthermore, due to the duty cycle, which is determined by the horizontal repetition rate and the pulse width, assume the average value of such pulse is 150 volts below the peak positive portion. When the diode 35 is caused to conduct, the peak voltage at the anode thereof will be clamped to approximately the voltage at the collector electrode of transistor 45. The average (D.C.) value of the pulse waveform applied to terminal 51 will appear across capacitor 37. If the difference between the peak and average values of the pulse waveform (150 volts) is approximately equal to the voltage at the collector of transistor 45, the average (D.C.) voltage at the junction of resistors 33 and 38 will be zero.

If the voltage at the collector electrode of transistor 45 is greater than the 150 volt peak-to-average difference of the pulse waveform, the D.C. (average) voltage at the anode of diode 35 will be greater than zero. This positive voltage serves to forward bias transistor 43, enabling it to draw current through the emitter circuit of transistor 45. The additional emitter current causes a drop in collector voltage of transistor 45 and hence serves to maintain the collector voltage at a value close to the 150 volts or the difference between the D.C. average value of the pulse and the positive peak value of the pulse.

On the other hand, if the collector voltage of transistor 45 is less than 150 volts, then the average D.C. voltage at the anode of the diode 35 will be negative. This action serves to reduce conduction of transistor 43 which therefore reduces the current drawn by transistor 45. This action then serves to raise the collector potential of transistor 45 so that the collector electrode is maintained at, for example, the desired 150 volts. The stability afforded by the operation of the circuit is maintained despite variations in circuit and component values and further, in spite of variations in the applied operating potentials, but the collector potential of transistor 45 will change with change in amplitude of the peak-to-average value of the pulse coupled to capacitor 37.

This characteristic of the circuit is utilized in connection with "setting-up" or initially adjusting the operating conditions of the picture tube 68. Specifically, resistors 56, 57 and 58 are adjusted to set the cutoff condition of each of the three guns of picture 68. As is customary in other types of color television receivers, the set-up procedure involves placing service switch 30 in the "SERVICE" position. This action transfers the ground connection of terminal 2 from the AGC circuit associated with terminal 1 to the vertical deflection circuit associated with terminal 3. The raster is collapsed to a single horizontal line by virtue of the latter connection. The I.F. amplifier stages are cut off by the operation of the AGC circuit so as to preclude video or color perturbations of the single line produced on picture tube 68. Furthermore, the outputs of color demodulators 19 will then all assume their quiescent (no color) levels which, for example, may be +5 volts. This condition corresponds to the outputs of demodulator 19 for a black level (or any gray scale) signal. Finally, the luminance amplifier transistor 29 is disconnected at switch terminals 4 and 5 from each of the drive modules 46, 66, 67.

It can be seen that disconnecting transistor 29 from the drive modules produces the same effect in the drive modules as cutting off current flow in transistor 29. By virtue of the characteristics of the illustrated circuit arrangement, this corresponds to a black level luminance signal condition. The picture tube 68 and associated controls may then be adjusted to produce the required black level (cutoff) condition for all three guns. The set-up procedure is as follows.

The screen control 70 is set at minimum voltage. Each of drive controls 60, 62, 64 are set at maximum values. Each of the guns are turned completely off by adjusting resistors 56, 57 and 58 to their maximum positive voltage positions. The screen control 70 is advanced until a line barely appears on picture tube 68 and then the screen control 70 is again turned down to just extinguish this line. Each of the potentiometers 56, 57 and 58 is then adjusted, in turn, to barely illuminate the respective phosphors of picture tube 68. A faint white line should be produced as a result of the adjustment of all three potentiometers. The service switch 30 is then returned to its "NORMAL" position and the drive controls 60, 62, 64 are adjusted to produce the desired color temperature (e.g., 9,300° K) of a white raster.

Thus, by varying the amplitude of the horizontal pulse supplied to capacitor 37, the amount of current supplied to transistor 43 via resistor 38 can be controlled. The average value of the pulse will increase along with increased peak amplitude of the pulse, but to a lesser extent, thereby increasing the difference between the average D.C. value of the pulse and the positive peak value of the pulse, which tends to raise the D.C. operating point of the collector of transistor 45. The collector voltage will be maintained substantially at the difference between peak and average value of the applied pulse waveform. Control of the collector voltage of transistor 45 thus may be achieved by controlling the pulse applied to terminals 51.

In a specific embodiment of the invention, the pulse supplied by the circuitry 15 to resistor 53 was approximately 400 volts peak-to-peak. With diode 54 coupled to an unregulated positive supply of 200 volts, the pulse at the junction of resistors 53 and 55 is clipped at a peak value of approximately 220 volts. Resistor 55 was chosen to be approximately 2,200 ohms, the resistors 57, 57 and 58 were each chosen to be of a value of 10,000 ohms and resistor 59 was chosen to be 5,600 ohms. The above-described values provide a range of voltages at the wiper of potentiometer 56 into terminal 51 of approximately 220 volts to 130 volts of peak-to-peak pulse amplitude. This range effectively can change the cathode bias from approximately 180 volts D.C. to 120 volts D.C. Resistor 55 prevents interaction or loading down of any of the output pulses when one of the wipers is at the maximum value i.e., preventing terminal 51 from being coupled directly to resistor 53 thereby loading down the pulse supplied to resistors 57 and 58. The changing of the peak-to-peak value of the pulse supplied to the terminal 51 of red drive module 46 will have very little effect upon the peak value of the pulse applied from the wipers of potentiometers 57 and 58 to their respective green and blue drivers 66 and 67. The horizontal flyback pulse can be unregulated as can be all the other supply voltages, the filament voltages of the picture tube 68, and the D.C. voltages supplied to the grids of picture tube 68. An increase in the horizontal flyback pulse amplitude caused by a change in line voltage can cause an increase in the peak-to-peak voltage applied to the terminal 51 of module 46. This in turn causes an increase in the bias applied to the cathode 74. In a similar way, a voltage increase is transferred to cathodes 75 and 76 via green drive modules 66 and 67. The relative change in voltage between cathodes 74, 75 and 76 with respect to the change in voltage seen by the control grid and the screen grid will remain aproximately the same i.e., they will track with changes in line voltage, therefore cut-off of all three guns will remain approximately the same with respect to one another.

An example of the circuit which operates satisfactorily utilized the following components by way of example:

| | |
|---|---|
| transistor **43** | SE4021 |
| transistor **45** | 2N3440 |
| resistor **32** | 10,000 ohms |
| resistor **33** | 2,200,000 ohms |
| resistor **34** | 10,000 ohms |
| resistor **36** | 3,900 ohms |
| resistor **38** | 220,000 ohms |
| resistor **40** | 180 ohms |
| resistor **41** | 220 ohms |
| resistor **42** | 39 ohms |
| resistor **53** | 2,200 ohms |
| resistor **55** | 270 ohms |
| resistors **56,57,58** | 10,000 ohms variable |
| resistor **59** | 5,600 ohms |
| resistor **81** | 560 ohms |
| diode **35** | FD222 |
| diode **54** | |
| capacitor **37** | 0.01 microfarads |
| capacitor **39** | 1.5 microfarads |
| capacitor **44** | .680 microfarads |
| color kinescope **68** | RCA 15 VAD CPO1 |

Typically, the positive-going pulse duration is approximately 12 microseconds and rise time of the pulse is about 2 microseconds with a fall time of about 2 microseconds.

It should be recognized that modifications may be made to the circuit without departing from the scope of the invention, the illustrated arrangement having been shown as an example of a practical circuit.

What is claimed is:

1. Apparatus for controlling electron beam current in a color picture tube having a plurality of electron guns, each gun having a separate cathode, the combination comprising:

a plurality of amplifier circuits each having an output electrode direct current coupled to a respective one of said cathodes and first and second input electrodes for application thereto of chrominance and luminance signals, respectively;

a plurality of voltage clamping circuits each coupled to an associated output electrode;

a single source of repetitive pulses of variable amplitude and predetermined duty cycle;

a plurality of adjustable voltage dividing circuits each associated with a separate one of said amplifier circuits for coupling controllable amplitude pulses from said source to an associated clamping circuit;

a plurality of current supplying means each coupled to an input electrode of an associated amplifier circuit and to an associated clamping circuit and responsive to a difference between the quiescent voltage at the associated amplifier circuit output electrode and the peak-to-average voltage difference of the repetitive pulse waveform applied to the associated clamping circuit for substantially maintaining a predetermined direct voltage at said associated output electrode and cathode.

2. Apparatus according to claim 1 wherein:

each said amplifier circuit comprises a first transistor having base, emitter and collector electrodes;

each said current supplying means comprises a second transistor having base, emitter and collector electrodes;

each said clamping circuit comprises a unidirectional current conducting device and a first cpacitor, each said current conducting device having first and second terminals, each said first terminal being coupled to the collector of an associated first transistor and each said second terminal being coupled to the base of an associated second transistor and an associated first capacitor;

each said first capacitor being coupled between a second terminal of an associated current conducting device and said source of pulses;

the collector electrode of each said second transistor being coupled to the emitter electrode of an associated first transistor for supplying current thereto in response to direct voltage developed at the second terminal of an associated current conducting device to thereby maintain the associated output electrode substantially at a predetermined direct voltage.

3. Apparatus as described in claim 2 wherein a separate voltage dividing circuit is associated with each of said amplifier circuits, said voltage dividing circuits including:

a common clipping circuit for limiting the amplitude of said repetitive pulses applied thereto;

a potentiometer having an input coupled to said clipping circuit and an adjustable output coupled to an associated clamping circuit; and impedance means coupled between said clipping circuit and said potentiometers for de-coupling said associated clamping circuits from said clipping circuit.

4. Apparatus for controlling electron beam current in a color picture tube having a plurality of cathodes, a single screen grid and a single control grid, each said cathode being associated with a different color-representative signal, the combination comprising:

a plurality of amplifier circuits equal in number to said cathodes, each amplifier circuit having an output electrode direct current coupled to one of said cathodes and first and second input electrodes for application thereto of chrominance and luminance signals;

a separate clamping circuit coupled to each of said output electrodes;

a single source of repetitive pulses of predetermined duty cycle;

a plurality of adjustable voltage dividing circuits, one associated with each of said amplifying circuits, for coupling a controllable portion of said pulses to each said clamping circuit;

current supplying means associated with each said amplifier circuit and coupled to an associated clamping circuit for supplying current to the associated amplifier circuit in response to differences between the quiescent voltage at the associated output electrode and the peak-to-average voltage difference of the pulses applied to the associated clamping circuit; and switching means operative for supplying chrominance and luminance inputs representative of black images to said first and second input electrodes of said amplifier circuits to facilitate adjustment of said voltage dividing circuits.

* * * * *

UNITED STATES PATENT OFFICE

CERTIFICATE OF CORRECTION

Patent No. 3,812,397 Dated May 21, 1974

Inventor(s) James Courtland Marsh, Jr.

It is certified that error appears in the above-identified patent and that said Letters Patent are hereby corrected as shown below:

On the Title Page, under "References Cited" "Kiekwood et al." should read--Kirkwood et al.--. At Column 1, Line 54, "15VAOTC01" should read --15VADTC01--. At Column 3, Line 66, "blue drive modules 65 and 67" should read --blue drive modules 66 and 67--. At Column 4, Line 4, "athode 74" should read --cathode 74--. At Column 6, Line 53, "terminals 51" should read --terminal 51--. At Column 6, Line 60, "57, 57, and 58" should read --56, 57 and 58--. At Column 8, Lines 39-43, following the phrase "in response to direct" there should be no new paragraph spacing for the passage beginning with "voltage developed at the second" and ending with "a predetermined direct voltage."

Signed and sealed this 8th day of October 1974.

(SEAL)
Attest:

McCOY M. GIBSON JR.
Attesting Officer

C. MARSHALL DANN
Commissioner of Patents